(12) United States Patent
Whitty

(10) Patent No.: US 8,049,974 B2
(45) Date of Patent: Nov. 1, 2011

(54) METHOD AND APPARATUS FOR ACCURATELY ALIGNING OPTICAL COMPONENTS

(75) Inventor: James R. Whitty, Midland (CA)

(73) Assignee: Raytheon Company, Waltham, MA (US)

(*) Notice: Subject to any disclaimer, the term of this patent is extended or adjusted under 35 U.S.C. 154(b) by 89 days.

(21) Appl. No.: 12/135,499

(22) Filed: Jun. 9, 2008

(65) Prior Publication Data
US 2009/0304333 A1    Dec. 10, 2009

(51) Int. Cl.
*G02B 7/02* (2006.01)
*G02B 9/04* (2006.01)

(52) U.S. Cl. ........ 359/811; 359/642; 359/793; 359/796; 359/900

(58) Field of Classification Search .......... 359/642, 359/796, 797, 819, 817, 622, 793–795, 784, 359/811, 900; 385/52
See application file for complete search history.

(56) References Cited

U.S. PATENT DOCUMENTS

| | | | | |
|---|---|---|---|---|
| 3,873,188 | A * | 3/1975 | Baeker ........................... | 359/742 |
| 4,662,717 | A * | 5/1987 | Yamada et al. ............... | 359/819 |
| 5,793,538 | A * | 8/1998 | Cameron et al. .............. | 359/731 |
| 6,072,634 | A * | 6/2000 | Broome et al. ................ | 359/637 |
| 7,088,530 | B1 * | 8/2006 | Recco et al. ................... | 359/784 |

* cited by examiner

*Primary Examiner* — Ricky Mack
*Assistant Examiner* — Zachary Wilkes
(74) *Attorney, Agent, or Firm* — Haynes and Boone, LLP

(57) ABSTRACT

A first part has first, second and third inwardly-facing surface portions angularly spaced about an axis, and a second part has outwardly-facing fourth, fifth and sixth surface portions spaced angularly about the axis, a radial distance from the axis to each surface portion decreasing progressively in a given direction along the axis. Each of the fourth, fifth and sixth surface portions faces, is closely adjacent to, and is substantially congruent in shape with a respective one of the first, second and third surface portions. At least one of the first and second parts is an optical component.

17 Claims, 3 Drawing Sheets

METHOD AND APPARATUS FOR ACCURATELY ALIGNING OPTICAL COMPONENTS

FIELD OF THE INVENTION

This invention relates in general to optical systems and, more particularly, to techniques for accurately aligning optical components with respect to each other.

BACKGROUND

In an optical system, especially a high-performance optical system, it is often necessary for lenses or other optical components to be very precisely aligned with respect to each other. A positional tolerance between the optical axes of two parts may need to be as small as a few microns.

As an example, one known configuration involves two lenses, where one lens has a recess that receives the other lens. The recess has a radially-inwardly facing cylindrical surface, and the lens in the recess has a radially-outwardly facing cylindrical surface, the two cylindrical surfaces differing only slightly in diameter, and being closely adjacent each other. Assembling or disassembling the two lenses can be very difficult because, if one lens is tilted even slightly with respect to the other during assembly or disassembly, the cylindrical surfaces bind and resist relative movement of the lenses.

To avoid this problem, it is possible to adjust the diameter of at least one of the cylindrical surfaces, in order to increase the space between the lenses. In order to align these two lenses, it is possible to use optical tooling, along with some additional structure that holds the lenses in place after they have been aligned. However, this approach is time consuming, and provides a reduced level of accuracy.

While these pre-existing approaches have been generally adequate for their intended purposes, they have not been satisfactory in all respects. No single existing approach provides fast and reliable assembly or disassembly of two optical components, with a high degree of centering accuracy, and without time-consuming alignment.

BRIEF DESCRIPTION OF THE DRAWINGS

A better understanding of the present invention will be realized from the detailed description that follows, taken in conjunction with the accompanying drawing, in which.

DETAILED DESCRIPTION

Figure 1:
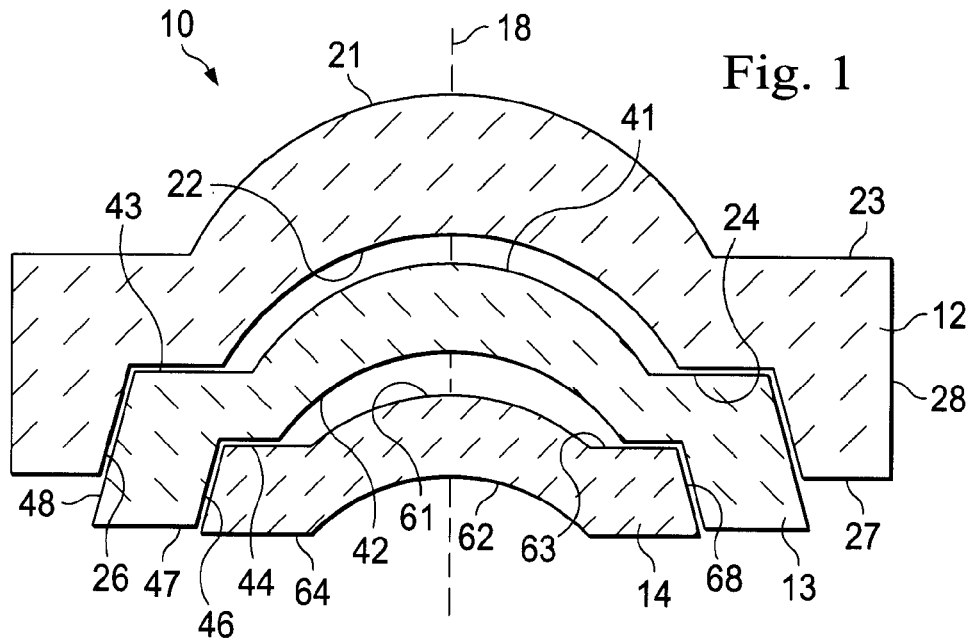
FIG. 1 is a diagrammatic sectional side view of an optical apparatus that embodies aspects of the present invention, and that includes first, second and third lenses.

FIG. 1 is a diagrammatic sectional side view of an optical apparatus 10 that embodies aspects of the present invention, and that includes three lenses 12, 13 and 14. The optical apparatus 10 could have any desired orientation. FIG. 1 shows the apparatus 10 in one possible orientation that has been arbitrarily selected to facilitate a clear and understandable explanation of the apparatus 10. The depicted orientation, and references to directions in the discussion below, are intended to be exemplary and not limiting.

The assembled optical apparatus 10 has an optical axis 18. The lenses 12-14 each have a respective optical axis that is coincident with the optical axis 18. The lenses 12, 13 and 14 are each made from a known optical material that will refract radiation having wavelengths within a range of interest. For example, the lenses may be made of glass where the apparatus 10 is to be used for visible radiation, or may be made of silicon or germanium where the apparatus 10 is to be used for infrared radiation.

Figure 2:
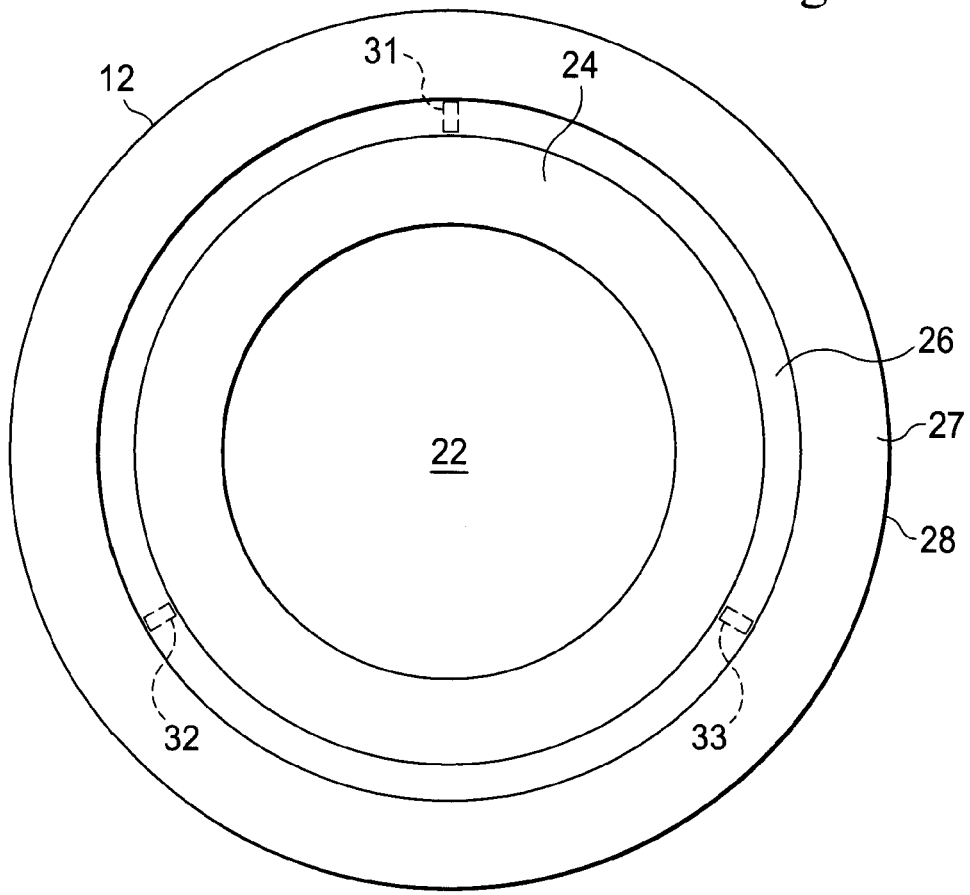
FIG. 2 is a diagrammatic bottom view of the first lens in FIG. 1.

FIG. 2 is a diagrammatic bottom view of the lens 12. With reference to FIGS. 1 and 2, the lens 12 has a convex surface 21 in the center of an upper side thereof, and has a concave surface 22 in the center of a lower side thereof. An annular, planar, axially-upwardly facing surface 23 extends radially outwardly from an outer peripheral edge of the convex surface 21, and is perpendicular to and concentric to the optical axis 18. An annular, planar, axially-downwardly facing surface 24 extends radially outwardly from an outer peripheral edge of the concave surface 22, and is perpendicular to and concentric to the optical axis 18. An annular, inwardly-facing surface 26 of frustoconical shape extends downwardly and outwardly from an outer peripheral edge of the annular surface 24, and is concentric to the optical axis 18. An annular, planar, axially-downwardly facing surface 27 extends radially outwardly from a lower peripheral edge of the frustoconical surface 26, and is perpendicular to and concentric to the optical axis 18.

An annular, cylindrical, radially-outwardly facing surface 28 extends axially from an outer peripheral edge of the surface 23 to an outer peripheral edge of the surface 27, and is concentric to the optical axis 18. With reference to FIG. 2, the frustoconical surface 26 has portions 31, 32 and 33 that are designated by broken lines, and that are angularly spaced from each other by intervals of approximately 120°. It will be noted that the radial distance from the axis 18 to the frustoconical surface 26 decreases progressively in an upward direction along the axis 18, and this is also true for each of the surface portions 31, 32 and 33.

Figure 3:
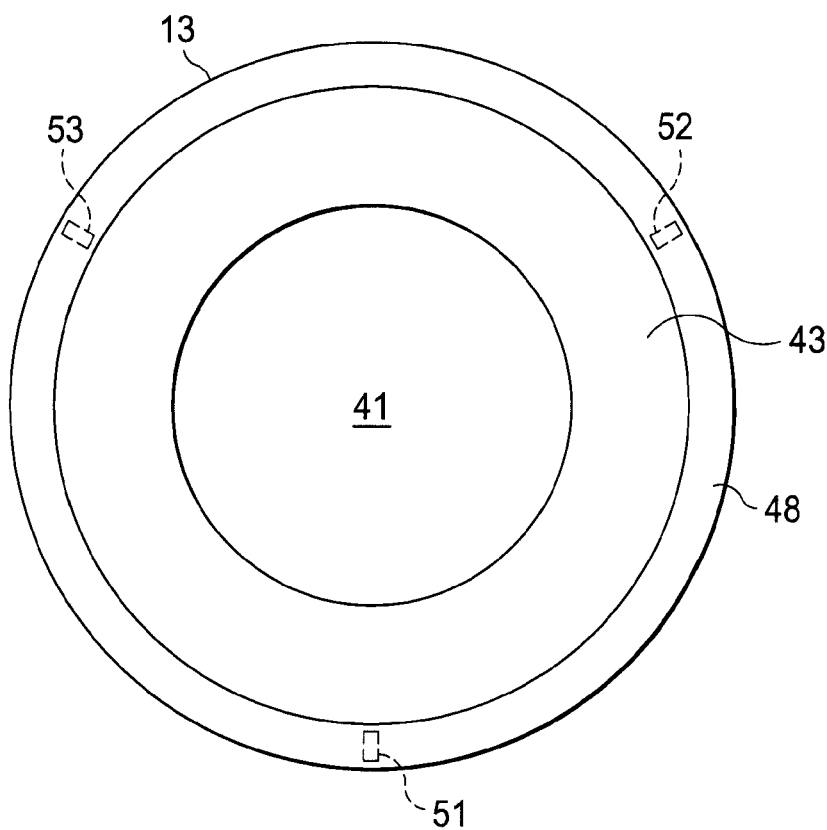
FIG. 3 is a diagrammatic top view of the second lens in FIG. 1.
Figure 4:
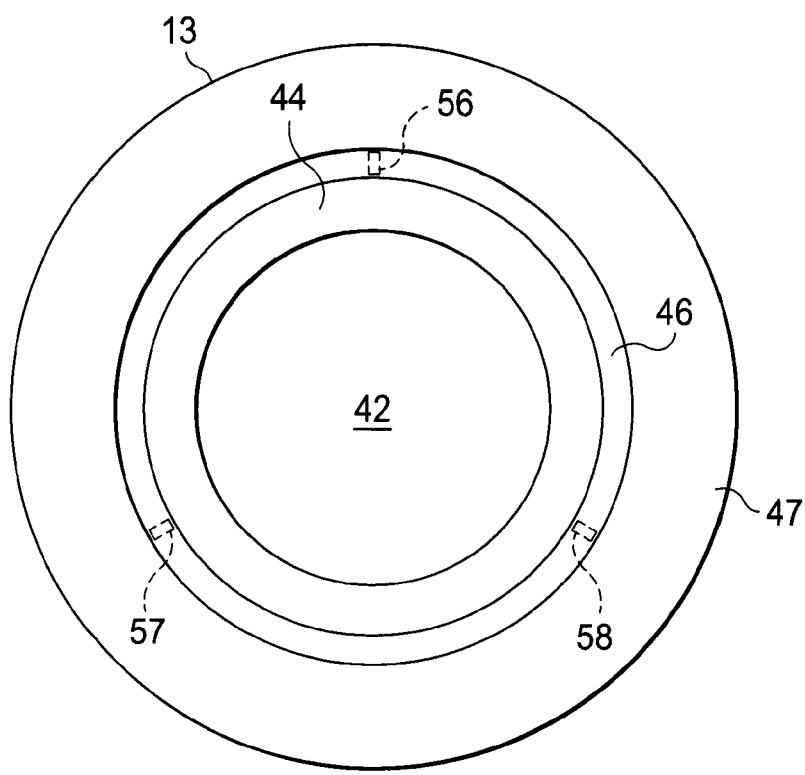
FIG. 4 is diagrammatic bottom view of the second lens in FIG. 1.

FIG. 3 is a diagrammatic top view of the lens 13, and FIG. 4 is diagrammatic bottom view of the lens 13. With reference to FIGS. 1, 3 and 4, the lens 13 has a convex surface 41 in the center of an upper side thereof, and a concave surface 42 in the center of a lower side thereof. An annular, planar, axially-upwardly facing surface 43 extends radially outwardly from an outer peripheral edge of the convex surface 41, and is perpendicular to and concentric to the optical axis 18. An annular, planar, axially-downwardly facing surface 44 extends radially outwardly from an outer peripheral edge of the concave surface 42, and is perpendicular to and concentric to the optical axis 18. An annular, inwardly-facing surface 46 of frustoconical shape extends downwardly and outwardly from an outer peripheral edge of the annular surface 44. The frustoconical surface 46 is concentric to the optical axis 18.

An annular, planar, axially-downwardly facing surface 47 extends radially outwardly from a lower peripheral edge of the frustoconical surface 46, and is perpendicular to and concentric to the optical axis 18. An annular, outwardly-facing surface 48 of frustoconical shape extends downwardly and outwardly from an outer peripheral edge of the annular surface 43 to an outer peripheral edge of the annular surface 47, and is concentric to the axis 18. With reference to FIG. 3, the frustoconical surface 48 has surface portions 51, 52 and 53 that are designated by broken lines, and that are angularly spaced from each other by intervals of approximately 120°. The radial distance from the axis 18 to the frustoconical surface 48 decreases progressively in an upward direction along the axis 18. This is also true for each of the surface portions 31, 32 and 33.

With reference to FIG. 4, the frustoconical surface 46 has portions 56, 57 and 58 that are designated by broken lines, and that are angularly spaced from each other by intervals of approximately 120°. The radial distance from the axis 18 to the frustoconical surface 48 decreases progressively in an upward direction along the axis 18. This is also true for each of the surface portions 51, 52 and 53.

With reference to FIG. 1, the annular surface 24 on lens 12 is adjacent and engages the annular surface 43 on lens 13, thereby preventing upward axial movement of the lens 13 relative to the lens 12. An air gap is present between the two surfaces 22 and 41. The frustoconical surface 26 on lens 12 is closely adjacent and may engage the frustoconical surface 48 on lens 13. In the assembled configuration shown in FIG. 1, the radial gap (if any) between frustoconical surfaces 26 and 48 is very small, for example on the order of about one micron. The surface portions 31, 32 and 33 of the frustoconical surface 26 are respectively adjacent the surface portions 51, 52 and 53 of the frustoconical surface 48, and each of the surface portions 31, 32 and 33 is substantially congruent in size and shape with the corresponding surface portion 51, 52 or 56 that is adjacent thereto. The cooperation between the frustoconical surfaces 26 and 48 ensures accurate centering of the lens 13 in relation to the lens 12, with a very small centering tolerance (for example a centering tolerance on the order of about one micron). When the lenses 12 and 13 are being assembled into or disassembled from the configuration shown in FIG. 1, the frustoconical shape of the surfaces 26 and 48 helps to ensure that these surfaces do not bind if one lens happens to tilt slightly in relation to the other lens.

Figure 5:
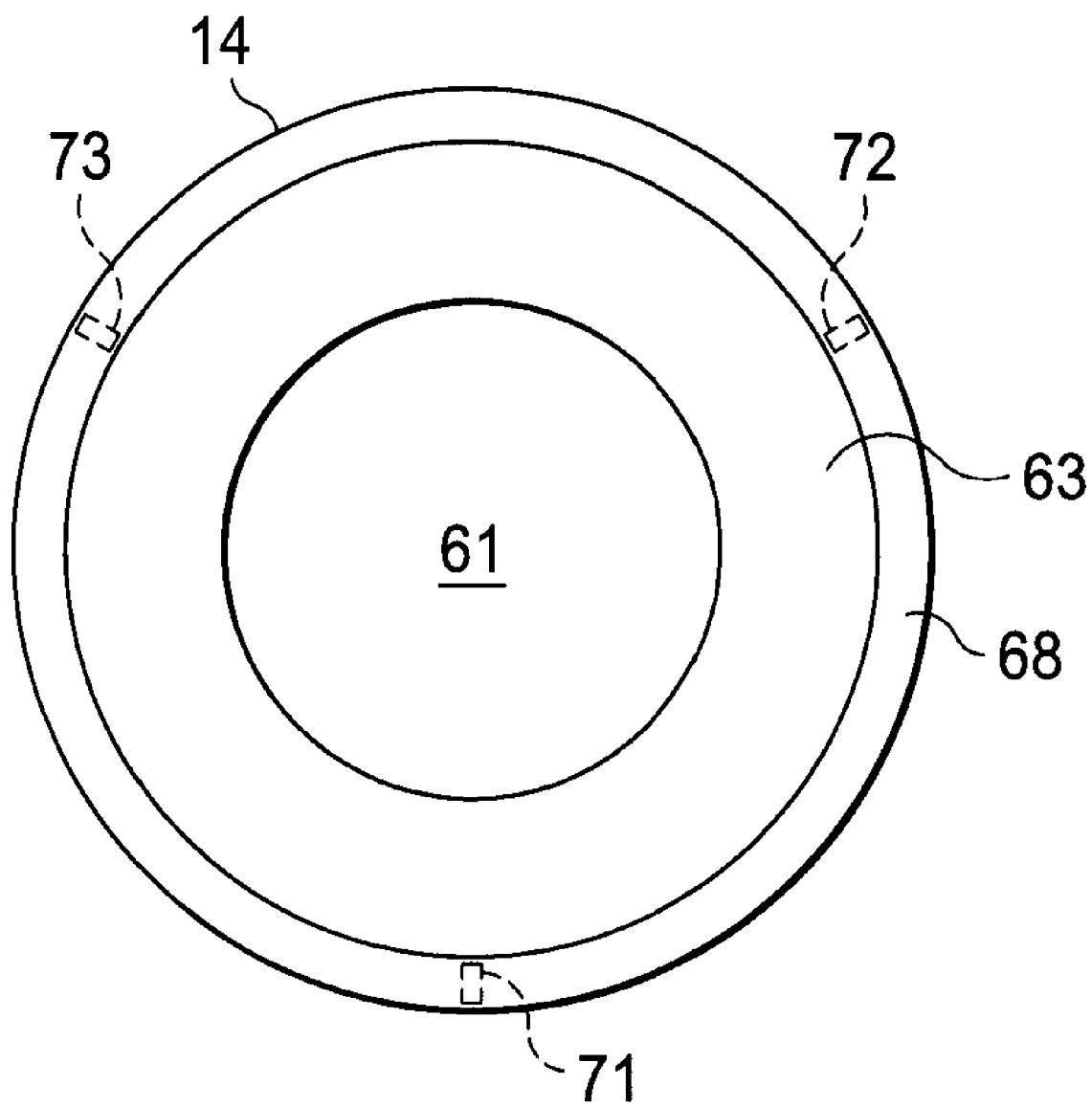
FIG. 5 is a diagrammatic top view of the third lens in FIG. 1.

FIG. 5 is a diagrammatic top view of the lens 14 of FIG. 1. With reference to FIGS. 1 and 5, the lens 14 has a convex surface 61 in the center of an upper side thereof, and a concave surface 62 in the center of a lower side thereof. An annular, planar, axially-upwardly facing surface 63 extends radially outwardly from an outer peripheral edge of the convex surface 61, and is perpendicular to and concentric to the optical axis 18. An annular, planar, axially-downwardly facing surface 64 extends radially outwardly from an outer peripheral edge of the concave surface 62, and is perpendicular to and concentric to the optical axis 18. An annular, outwardly-facing surface 68 of frustoconical shape extends downwardly and outwardly from an outer peripheral edge of the annular surface 63 to an outer peripheral edge of the annular surface 64, and is concentric to the optical axis 18.

With reference to FIG. 5, the frustoconical surface 68 has surface portions 71, 72 and 73 that are designated by broken lines, and that are angularly spaced from each other by intervals of approximately 120°. The radial distance from the axis 18 to the frustoconical surface 68 decreases progressively in an upward direction along the axis 18. This is also true for each of the surface portions 71, 72 and 73.

With reference to FIG. 1, the annular surface 44 on lens 13 is adjacent and engages the annular surface 63 on lens 14, thereby preventing upward axial movement of the lens 14 in relation to the lens 13. An air gap is present between the two surfaces 42 and 61. The frustoconical surface 68 on lens 14 is closely adjacent and may engage the frustoconical surface 46 on lens 13. In the assembled configuration shown in FIG. 1, the radial gap (if any) between the frustoconical surfaces 46 and 68 is very small, for example on the order of about one micron. The surface portions 56, 57 and 58 of the frustoconical surface 46 are respectively adjacent the surface portions 71, 72 and 73 of the frustoconical surface 68, and each of the surface portions 56, 57 and 58 is substantially congruent in size and shape with the corresponding surface portion 71, 72 or 76 that is adjacent thereto. The cooperation between the frustoconical surfaces 46 and 68 ensures accurate centering of the lens 14 in relation to the lens 13, with a very small centering tolerance (for example a centering tolerance on the order of about one micron). When the lenses 13 and 14 are being assembled into or disassembled from the configuration shown in FIG. 1, the frustoconical shape of the surfaces 46 and 68 helps to ensure that these surfaces do not bind if one lens happens to tilt slightly in relation to the other lens.

In FIG. 1, the intersections of most surfaces are shown as relatively sharp corners. However, these sharp corners could alternatively be replaced with rounded corners of relatively small radius.

In the disclosed embodiment, the surfaces 24, 43, 26, 48, 44, 63, 46 and 68 are all formed using known techniques of single diamond point turning, in order to achieve a high degree of accuracy. Other surfaces on the lenses 12-13 could also optionally be formed though the use of diamond point turning. However, the invention is not limited to diamond point turning, and it would be possible to alternatively use any other suitable technique to accurately form surfaces on the lenses.

In the disclosed embodiment, the surfaces 26, 48, 46 and 68 are shown as being frustoconical. Alternatively, however, it would be possible to use some other suitable shape, including but not limited to a shape corresponding to the exterior side surface of any of a variety of frustums.

Although the components 12, 13 and 14 in the apparatus 10 of FIG. 1 are all lenses, one or more of them could alternatively be some other type of component. For example, one or more of these components could be an optical mirror. Also, some specific materials have been discussed above for the components 12-14, but they could alternatively be made of any other suitable material. For example, where any of the components 12-14 is a lens, it could be made of a suitable plastic material. As another example, where any of the components 12-14 is a mirror, it could be made of metal.

Although selected embodiments have been illustrated and described in detail, it should be understood that a variety of substitutions and alterations are possible without departing from the spirit and scope of the present invention, as defined by the claims that follow.

What is claimed is:

1. An apparatus comprising:
    a first part having first, second and third surface portions that are angularly offset from each other about an axis, and that each face inwardly in relation to said axis, wherein for each of said first, second and third surface portions, a radial distance from said axis to the surface portion decreases progressively in a given direction along said axis; and
    a second part having fourth, fifth and sixth surface portions that are angularly offset from each other about said axis, and that each face outwardly in relation to said axis, wherein for each of said fourth, fifth and sixth surface portions, a radial distance from said axis to the surface portion decreases progressively in said given direction along said axis, and wherein each of said fourth, fifth and sixth surface portions faces, is closely adjacent to, and is substantially congruent in shape with a respective one of said first, second and third surface portions;
    wherein one of said first and second parts is an optical component;
    wherein said first part has a seventh surface portion facing approximately opposite said given direction;

wherein said second part has an eighth surface portion facing approximately in said given direction and engaging said seventh surface portion;

wherein said first part has a first annular surface extending around said axis such that a radial distance from said axis to said first annular surface decreases progressively in said given direction along said axis, said first, second and third surface portions being respective portions of said first annular surface;

wherein said second part has a second annular surface extending around said axis such that a radial distance from said axis to said second annular surface decreases progressively in said given direction along said axis, said fourth, fifth and sixth surface portions being respective portions of said second annular surface;

wherein said first part has a third annular surface extending around said axis, said seventh surface portion being a portion of said third annular surface;

wherein said second part has a fourth annular surface extending around said axis, said eighth surface portion being a portion of said fourth annular surface;

wherein said first part includes a first concave surface immediately adjacent to said third annular surface, said third annular surface extending radially outwardly from an outer peripheral edge of said first concave surface; and wherein said second part includes a first convex surface immediately adjacent to said fourth annular surface, said fourth annular surface extending radially outwardly from an outer peripheral edge of said first convex surface, and said first convex surface being in a complementary facing relationship with said first concave surface to form a first air gap therebetween.

2. An apparatus according to claim 1, wherein said first and second annular surfaces each correspond in shape to part of an exterior surface of a frustum.

3. An apparatus according to claim 2, wherein said first and second annular surfaces are each frustoconical.

4. An apparatus according to claim 1, wherein said first and second parts are each an optical component.

5. An apparatus according to claim 4, wherein said first and second parts are each a lens.

6. An apparatus according to claim 1, wherein said second part further has ninth, tenth and eleventh surface portions that are angularly offset from each other about said axis, and that each face inwardly in relation to said axis, wherein for each of said ninth, tenth and eleventh surface portions, a radial distance from said axis to the surface portion decreases progressively in said given direction along said axis; and including a third part having twelfth, thirteenth and fourteenth surface portions that are angularly offset from each other about said axis, and that each face outwardly in relation to said axis, wherein for each of said twelfth, thirteenth and fourteenth surface portions, a radial distance from said axis to the surface portion decreases progressively in said given direction along said axis, and wherein each of said twelfth, thirteenth and fourteenth surface portions faces, is closely adjacent to, and is substantially congruent in shape with a respective one of said ninth, tenth and eleventh surface portions.

7. An apparatus according to claim 6, wherein said second part has a fifth annular surface extending around said axis and facing approximately opposite said given direction;

wherein said third part has a sixth annular surface extending around said axis, facing approximately in said given direction, and engaging said fifth annular surface;

wherein the second part includes a second concave surface immediately adjacent to said fifth annular surface, said fifth annular surface extending radially outwardly from an outer peripheral edge of said second concave surface; and wherein said third part includes a second convex surface immediately adjacent to said sixth annular surface, said sixth annular surface extending radially outwardly from an outer peripheral edge of said second convex surface, and said second convex surface being in a complementary facing relationship with said second concave surface to form a second air gap therebetween.

8. An apparatus according to claim 1, wherein said seventh surface portion is closer to said axis than said first annular surface; and wherein said eighth surface portion is closer to said axis than said second annular surface.

9. A method comprising:

forming on a first part first, second and third surface portions that are angularly offset from each other about a first axis, and that each face inwardly in relation to said first axis, wherein for each of said first, second and third surface portions, a radial distance from said first axis to the surface portion decreases progressively in a given direction along said first axis;

forming on a second part fourth, fifth and sixth surface portions that are angularly offset from each other about a second axis, and that each face outwardly in relation to said second axis, wherein for each of said fourth, fifth and sixth surface portions, a radial distance from said second axis to the surface portion decreases progressively in said given direction along said second axis, wherein each of said fourth, fifth and sixth surface portions corresponds to and is substantially congruent in shape with a respective one of said first, second and third surface portions, one of said first and second parts being an optical component;

positioning said first and second parts in relation to each other so that each of said fourth, fifth and sixth surface portions faces and is closely adjacent the corresponding one of said first, second and third surface portions;

forming on said first part a seventh surface portion facing approximately opposite said given direction; and forming on said second part an eighth surface portion facing approximately in said given direction and engaging said seventh surface portion;

wherein said forming of said first, second and third surface portions includes forming on said first part a first annular surface extending around said first axis such that a radial distance from said first axis to said first annular surface decreases progressively in said given direction along said first axis, said first, second and third surface portions being respective portions of said first annular surface;

wherein said forming of said fourth, fifth and sixth surface portions includes forming on said second part a second annular surface extending around said second axis such that a radial distance from said second axis to said second annular surface decreases progressively in said given direction along said second axis, said fourth, fifth and sixth surface portions being respective portions of said second annular surface;

forming on said first part a third annular surface extending around said first axis, said seventh surface portion being a portion of said third annular surface;

forming on said second part a fourth annular surface extending around said second axis, said eighth surface portion being a portion of said fourth annular surface;

forming on said first part a first concave surface immediately adjacent to said third annular surface, said third annular surface extending radially outwardly from an outer peripheral edge of said first concave surface;

forming on said second part a first convex surface immediately adjacent to said fourth annular surface, said fourth annular surface extending radially outwardly from an outer peripheral edge of said first convex surface; and positioning said first and second parts in relation to each other so that said third annular surface engages said fourth annular surface and that said first convex surface is in a complementary facing relationship with said first concave surface to form a first air gap therebetween.

10. A method according to claim 9, wherein said forming of each of said first and second annular surfaces is carried out so that said first and second annular surfaces each correspond in shape to part of an exterior surface of a frustum.

11. A method according to claim 10, wherein said forming of each of said first and second annular surfaces is carried out so that said first and second annular surfaces are each frusto-conical.

12. A method according to claim 9, including configuring each of said first and second parts to be an optical component.

13. A method according to claim 12, including configuring each of said first and second parts to be a lens.

14. A method according to claim 9, including:
forming on said second part ninth, tenth and eleventh surface portions that are angularly offset from each other about said second axis, and that each face inwardly in relation to said second axis, wherein for each of said ninth, tenth and eleventh surface portions, a radial distance from said second axis to the surface portion decreases progressively in said given direction along said axis;

forming on a third part twelfth, thirteenth and fourteenth surface portions that are angularly offset from each other about a third axis, and that each face outwardly in relation to said third axis, wherein for each of said twelfth, thirteenth and fourteenth surface portions, a radial distance from said third axis to the surface portion decreases progressively in said given direction along said axis, and wherein each of said twelfth, thirteenth and fourteenth surface portions corresponds to and is substantially congruent in shape with a respective one of said ninth, tenth and eleventh surface portions; and positioning said second and third parts in relation to each other so that each of said twelfth, thirteenth and fourteenth surface portions faces and is closely adjacent the corresponding one of said ninth, tenth and eleventh surface portions.

15. A method according to claim 14,
forming on said second part a fifth annular surface extending around said second axis and facing approximately opposite said given direction;

forming on said third part a sixth annular surface extending around said third axis and facing approximately in said given direction;

forming on said second part a second concave surface immediately adjacent to said fifth annular surface, said fifth annular surface extending radially outwardly from an outer peripheral edge of said second concave surface;

forming on said third part a second convex surface immediately adjacent to said sixth annular surface, said sixth annular surface extending radially outwardly from an outer peripheral edge of said second convex surface; and positioning said second and third parts in relation to each other so that said fifth annular surface engages said sixth annular surface and that said second convex surface is in a complementary facing relationship with said second concave surface to form a second air gap therebetween.

16. A method according to claim 9, wherein said forming of each of said first, second, third, fourth, fifth, sixth and seventh surface portions is carried out using diamond point turning.

17. A method according to claim 9,
wherein said forming on said first part of said seventh surface portion is carried out so that said seventh surface portion is closer to said first axis than said first annular surface; and wherein said forming on said second part of said eighth surface portion is carried out so that said eighth surface portion is closer to said second axis than said second annular surface.

* * * * *